United States Patent [19]

Kuwajima

[11] Patent Number: 4,860,099
[45] Date of Patent: Aug. 22, 1989

[54] VIDEO SIGNAL PROCESSING CIRCUIT FOR VTR SYSTEM

[75] Inventor: Takeshi Kuwajima, Tokyo, Japan
[73] Assignee: NEC Corporation, Japan
[21] Appl. No.: 216,328
[22] Filed: Jul. 7, 1988
[30] Foreign Application Priority Data Jul. 7, 1987 [JP] Japan ................................ 62-170033

[51] Int. Cl.⁴ .............................................. H04N 5/04
[52] U.S. Cl. .................................... 358/148; 358/150; 358/171
[58] Field of Search ............... 358/148, 150, 155, 158, 358/171, 172, 319, 337; 360/10.1, 10.3, 37.1

[56] References Cited
U.S. PATENT DOCUMENTS 4,701,786 10/1987 Yamanaka ............................. 358/32
4,725,898 2/1988 Tokuyama ......................... 360/10.1

Primary Examiner—James J. Groody
Assistant Examiner—David E. Harvey
Attorney, Agent, or Firm—Laff, Whitesel, Conte & Saret

[57] ABSTRACT

A video signal processing circuit for a VTR system is disclosed. In a special playback mode such as "STILL", "SLOW" and "QUICK" modes, a pseudo vertical synchronizing signal is supplied which has a train of pulses at a predetermined cycle proportional to one horizontal cycle. There are provided a detection circuit for detecting the pseudo vertical synchronizing signal to produce a detection signal and a pulse separator separating the train of pulses from the pseudo vertical synchronizing signal. When the detection signal is produced, a reproduced video signal is supplied to a clamping circuit which clamps each synchronizing signal contained in the reproduced video signal at a predetermined level. When the detection signal is not produced, on the other hand, the separated pulses are transferred to the clamping circuit, and the clamping circuit is controlled to be made inoperative during the production period of each pulse.

8 Claims, 5 Drawing Sheets

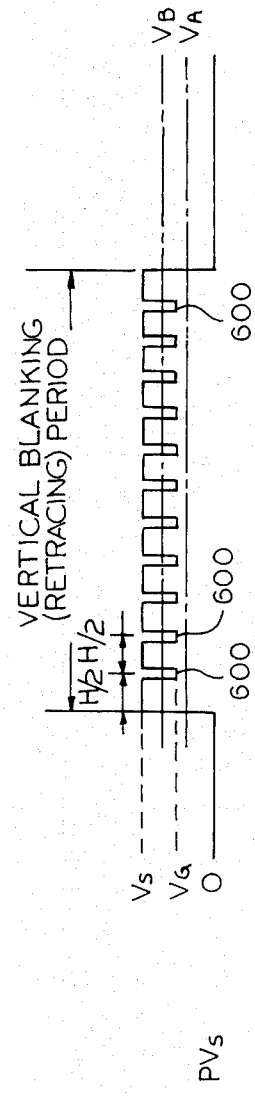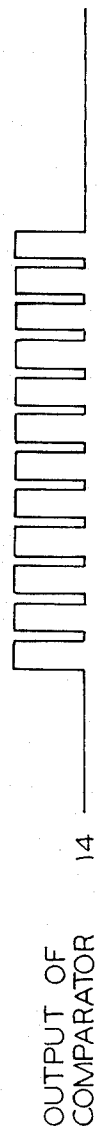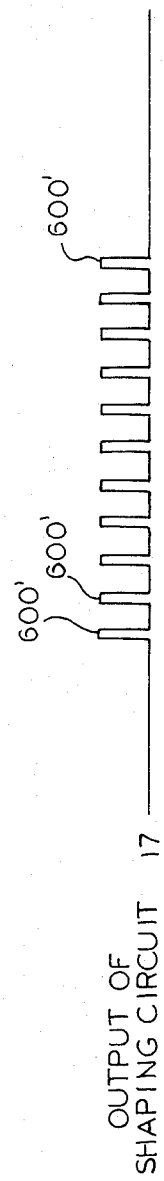

VIDEO SIGNAL PROCESSING CIRCUIT FOR VTR SYSTEM

BACKGROUND OF THE INVENTION

The present invention relates to a video signal processing circuit for a video tape recorder (hereinafter called "VTR") and more particularly to a level clamping circuit used in the video signal processing circuit.

A video signal regeneration circuit in VTR includes a level clamping circuit for clamping a tip level of each synchronizing signal contained in a reproduced (playback) video signal at a predetermined level (hereinafter called "clamp level"). The VTR has not only a normal playback mode but special playback modes such as "STILL", "SLOW" and "QUICK" modes. A vertical synchronizing signal contained in the video signal reproduced in the special regeneration modes cannot be used for vertical synchronization of a television receiver. Therefore, a pseudo vertical synchronizing signal is prepared independently and is inserted in a special mode reproduced video signal. The tip level of the pseudo vertical synchronizing signal thus inserted is required to be aligned with the clamp level. For this purpose, the pseudo vertical synchronizing signal is inserted into the reproduced video signal at a stage before the level clamping circuit.

Normally, a television signal includes equivalent pulses of ½ horizontal period (½ H) during a vertical blanking (retracing) period, and a horizontal AFC (Automatic Frequency Control) circuit used in recent high-resolution television receivers also responds to the equivalent pulses to control a horizontal synchronizing oscillator, so that the oscillation frequency of the horizontal synchronizing oscillator is maintained constantly also during the vertical blanking period. Therefore, a pseudo vertical synchronizing signal is added with pulses at a cycle proportional to one horizontal cycle, e.g., at a ½ horizontal cycle.

However, the prior art merely inserts such a pseudo vertical synchronizing signal into the special mode reproduced video signal at a stage before the clamping circuit. For this reason, the pseudo vertical synchronizing signal is wholly clamped at the clamp level, the pulses at ½ horizontal cycles disappear. As a result, the horizontal AFC circuit does not operate and the horizontal synchronizing oscillator deviates from a predetermined oscillation frequency.

SUMMARY OF THE INVENTION

An object of the present invention is to provide an improved video signal processing circuit for VTR.

Another object of the present invention is to provide a video signal processing circuit which can insert a pseudo vertical synchronizing signal into a reproduced video signal at a stage before a level clamping circuit which maintaining pulses contained in the pseudo vertical synchronizing signals.

Still another object of the present invention is to provide a video signal processing circuit which can output a special mode reproduced video signal having a pseudo vertical synchronizing signal and a train of pulses of a cycle proportional to one horizontal cycle.

A video signal processing circuit according to the invention comprises a first input terminal supplied with a reproduced video signal, a second input terminal supplied with a pseudo vertical synchronizing signal having pulses at a predetermined cycle, means coupled to the second input terminal for detecting the pseudo vertical synchronizing signal to generate a detection signal, means coupled to the second input terminal for separating the pulses from the pseudo vertical synchronizing signal, output means coupled to the first output terminal and the separating means for outputting the reproduced video signal when the detection signal is not generated and for outputting the separated pulses when the detection signal is generated, and clamping means coupled to the output means for clamping an output signal from the output means at a predetermined level during a period corresponding to a synchronizing signal period except for periods when the pulses exist.

According to the invention, the pulses contained in the pseudo vertical synchronizing signal are separated therefrom, and the clamping means is made inoperative during periods of the pulse. Accordingly, the clamping means outputs the reproduced video signal which is inserted with the pseudo vertical synchronizing signal and has the pulses relating to one horizontal cycle during the vertical synchronizing period. Moreover, the tip level of each synchronizing signal is clamped at the predetermined level.

BRIEF DESCRIPTION OF THE DRAWINGS

The above and other objects, advantages and features of the present invention will be more apparent from the following description taken in conjunction with the accompanying drawings, in which

FIGS. 2A to 2E are signal waveform drawings for illustrating the operation of the circuit shown in FIG. 1;

DETAILED DESCRIPTION OF THE EMBODIMENTS

Figure 1:
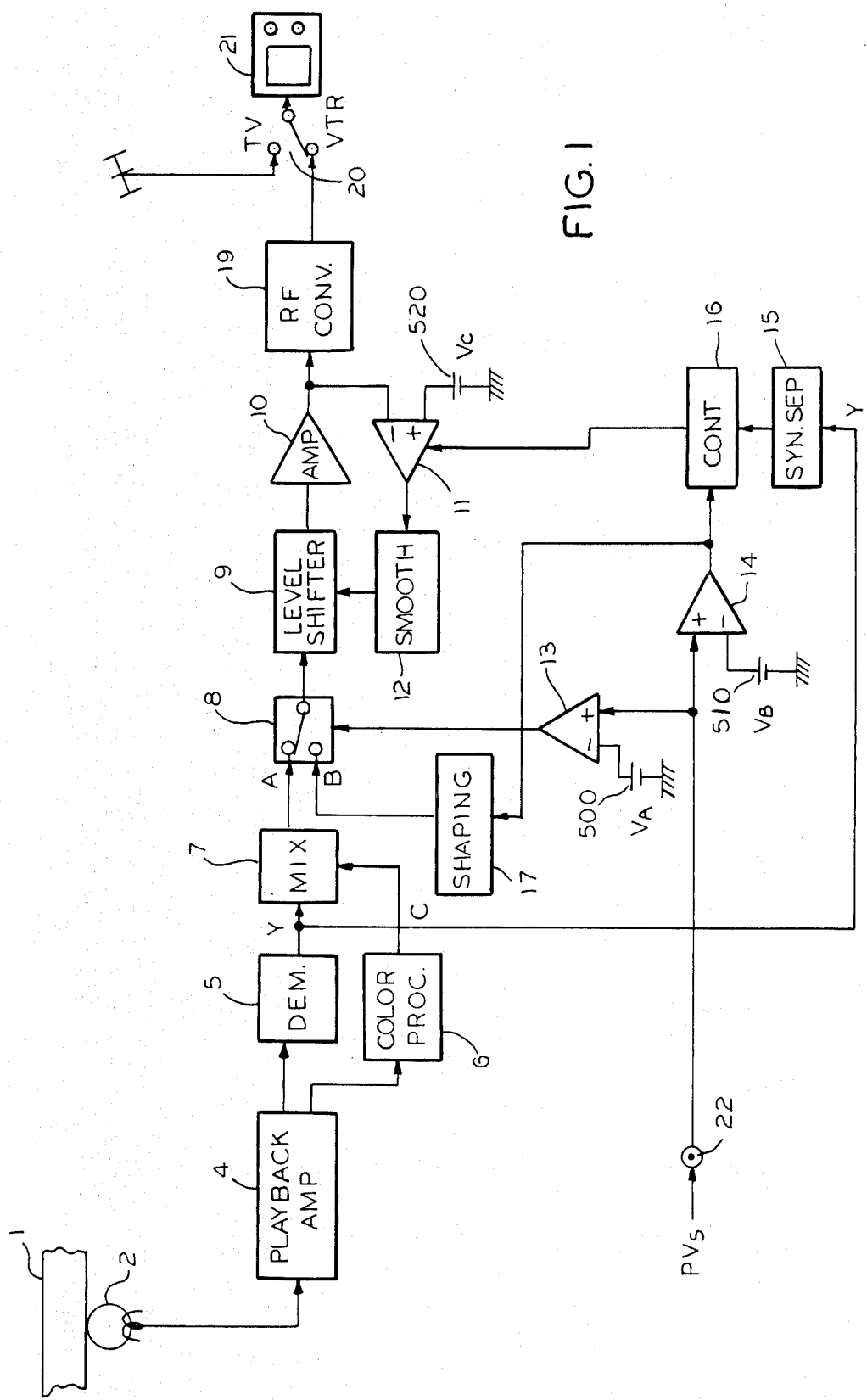
FIG. 1 is a block diagram representing an embodiment of the present invention.

Referring to FIG. 1, a pseudo vertical synchronizing signal PVs generated in a special playback mode is supplied to a terminal 22 and applied to the non-inversion input terminals (+) of comparators 13 and 14. A first reference voltage $V_A$ is applied to an inversion input terminal (−) of the comparator 13 from a voltage source 500, and a second reference voltage $V_B$ is impressed to the inversion input terminal (−) of the comparator 14 from a voltage source 510. An output of the comparator 14 is fed to a terminal B of a switch circuit 8 through a waveform shaping circuit 17. A reproduced video signal is supplied to a terminal A of the switch circuit 8. The comparator 13 controls a switching operation of the switch circuit 8. An output of the switch circuit 8 is fed to a clamping circuit comprising a level shifter 9, an amplifier 10, a comparator 11, a smoothing circuit 12 and a voltage source 520. The comparing operation of the comparator 11 is controlled by a signal generated by a control circuit 16. An output of the comparator 14 and horizontal and vertical synchronizing signals from a synchronizing signal separating circuit 15 are fed to the control circuit 16. The control circuit 16 actuates the comparator 11 when an output of the comparator 14 is in a high level, or when synchronizing signals are outputted from the separating circuit 15.

A signal recorded on a video tape 1 is read-out by a video head 2 and fed to a playback amplifier 4 which in turn amplifiers the inputted signal and then separates it into an FM modulated luminance signal and a frequency-converted chroma (color) signal. The FM modulated luminance signal is demodulated by a demodulator 5 to produce a luminance signal Y and a color signal processing circuit 6 generates an original chroma signal C. These signals Y and C are supplied to a mixing circuit 7, so that a reproduced video signal is generated from the mixer 7 and then supplied to a terminal A of the switch circuit 8. The luminance signal Y is also supplied to the synchronizing separator 15.

An output of the amplifier 10 is fed to an RF (Radio Frequency) converter 19 and thus converted into a television signal. A switch 20 changes over an input terminal of a television receiver 21 to the reproduced video signal input or a TV broadcasting input.

The pseudo, vertical synchronizing signal PVs is not supplied to the terminal 22 in the normal playback mode, that is, it takes a low level (GND). Therefore, the output of the comparator 13 comes to the low level. The switch circuit 8 is thereby changed to the terminal A. Thus, the reproduced video signal from the mixing circuit 7 is fed to the level shift circuit 9 and transmitted to the amplifier 10. When the synchronizing separator 15 outputs vertical or horizontal synchronizing separation signals, the control circuit 16 actuates the comparator 11. Accordingly, the comparator 11 compares the tip level of each synchronizing signal contained in the reproduced video signal with a third reference voltage Vc from the voltage source 520 and outputs a control signal so as to equalize them to each other. The control signal is smoothed to a DC voltage by the smoothing circuit 12, and the DC voltage is fed back to the level shift circuit 9 to control the level shift amount thereof. As a result, the tip level of each synchronizing signal in the reproduced video signal is clamped to the reference voltage Vc.

In special regeneration modes such as "STILL", "SLOW" and "QUICK", the pseudo vertical synchronizing signal PVs is supplied to the terminal 22. As shown in FIG. 2A, the signal PVs has an amplitude of a Vs level during a pseudo vertical blanking (retracing) period and takes 0V during other periods. Further, pulses 600 are interposed on the signal PVs at a cycle relating to one horizontal cycle. In this embodiment, the pulses 600 have a ½ horizontal cycle (½ H). If desired, they may be 1H or 2H. Namely, the cycle of the pulses 600 depends on characteristics of an horizontal AFC circuit (not shown) in the television receiver 21. The tip level of each pulse 600 has a $V_G$ level that is an intermediate level between Vs level and 0V. The comparator 13 detects the pseudo vertical synchronizing signal PVs, and the comparator 14 detects each pulse 600. As shown in FIG. 2A, the first reference voltage $V_A$ is designed to be between $V_G$ level and 0V, and the second reference voltage $V_B$ is designed to be between Vs and $V_G$ levels. That is, a relationship of $V_A < V_G < V_B < V_S$ is set. Accordingly, when the pseudo vertical synchronizing signal PVs is fed to the terminal 22, the comparator 13 generates the high level output (see FIG. 2B) and the comparator 14 generates the high level output during the period correspond to the pseudo vertical blanking period but excluding periodes of the pulses 600 (see FIG. 2C). The output of the comparator 14 is supplied to the waveform shaping circuit 17 which in turn generates a train of pulses 600' each having a limited amplitude in response to the inputted low level during the pseudo vertical blanking period, as shown in FIG. 2D. Thus, the pulses 600 interposed on the pseudo vertical synchronizing signal PVs is separated by the comparator 14 and the waveform shaper 17. The separated pulses 600' are then fed to the terminal B of the switch circuit 8. The control circuit 16 actuates the comparator 11 when the output of the comparator 14 takes the high level, and therefore the level clamping operation is carried out during the pseudo vertical blanking period excluding the periodes of the pulses 600, or during each synchronizing signal period in the reproduced video signal.

In the special playback mode, the output of the comparator 13 takes the low level when the pseudo vertical synchronizing signal PVs is not fed to the terminal 22, and therefore the switch circuit 8 is changed to the terminal A. The reproduced video signal outputted from the mixing circuit 7 is thereby fed to the level shift circuit 9 and transmitted to the amplifier 10. When the cynchronizing signal separator 15 separates the synchronizing signal in response to the luminance signal Y, the control circuit 16 actuates the comparator 11. As a result, the tip level of each synchronizing signal in the reproduced video signal is clamped at the third reference voltage Vc.

When the pseudo vertical synchronizing signal VPs (FIG. 2A) is fed to the terminal 22, the comparator 13 generates the high level signal during the pseudo vertical blanking period (FIG. 2B), so that the switch circuit 8 is changed to the terminal B which is in turn supplied with a train of pulses 600' (FIG. 2C) having a cycle of ½ H from the waveform shaping circuit 17. The comparator 11 is made inoperative while the pulses 600' are present but is made operative to attain a level clamping operation during the period of the adjacent pulses 600'. Thus, a train of pulses 600' having a cycle of ½ H are inserted in the pseudo vertical synchronizing signal portion in the reproduced video signal, and voltage levels of the portions other than the pulses 600' are clamped at the reference voltage Vc, as shown in FIG. 2E. Accordingly, the horizontal AFC circuit of the television receiver 21 can control a horizontal synchronizing oscillator even during the pseudo vertical blanking period.

Figure 3:
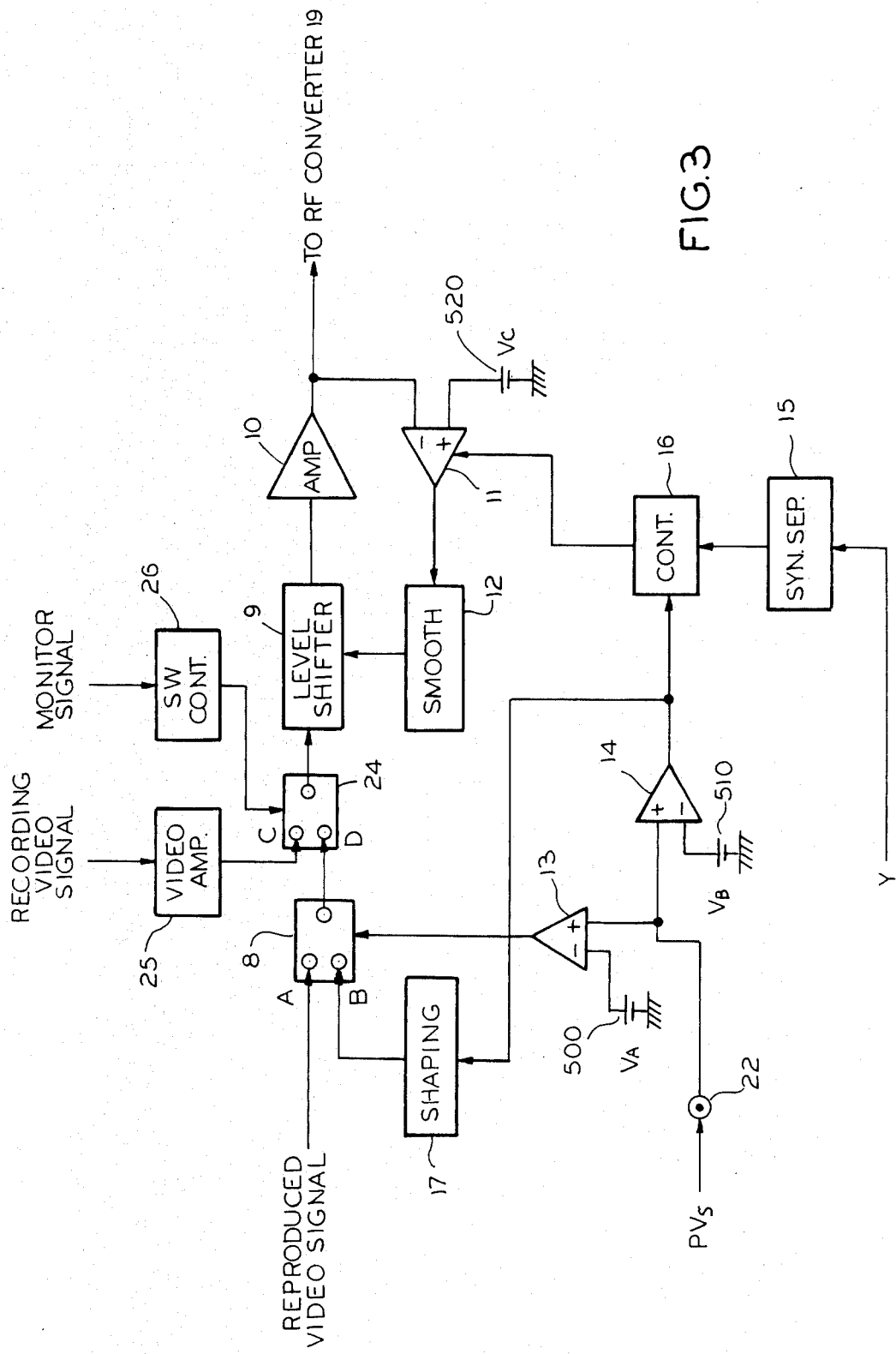
FIG. 3 is a block diagram representing another embodiment of the present invention.

VTR is further required to monitor a video signal which is currently recoded on the tape 1. For this purpose, as shown in FIG. 3 as another embodiment of the invention, a second switch circuit 24 is provided between the switch circuit 8 and the level shifter 9. The output of the switch circuit 8 is fed to a terminal D of the switch circuit 24, and a recording video signal is fed to a terminal C thereof through a video amplifier 25. The switch circuit 24 is controlled by a control circuit 26 responsive to a monitor signal.

In playback modes, the switch circuit 24 is changed to the terminal D. In a monitoring mode, the control circuit 26 changes the switch circuit 24 the terminal C in response to the monitor signal. Accordingly, the recoding video signal is fed to the level shifter 9. Although not shown, a luminance signal Y based upon the recording video signal is fed to the synchronizing signal separater 15. Accordingly, the tip level of each synchronizing signal in the recording video signal is clamped at the reference voltage Vc from the voltage source 520 and then fed to the RF converter 19.

Figure 4:
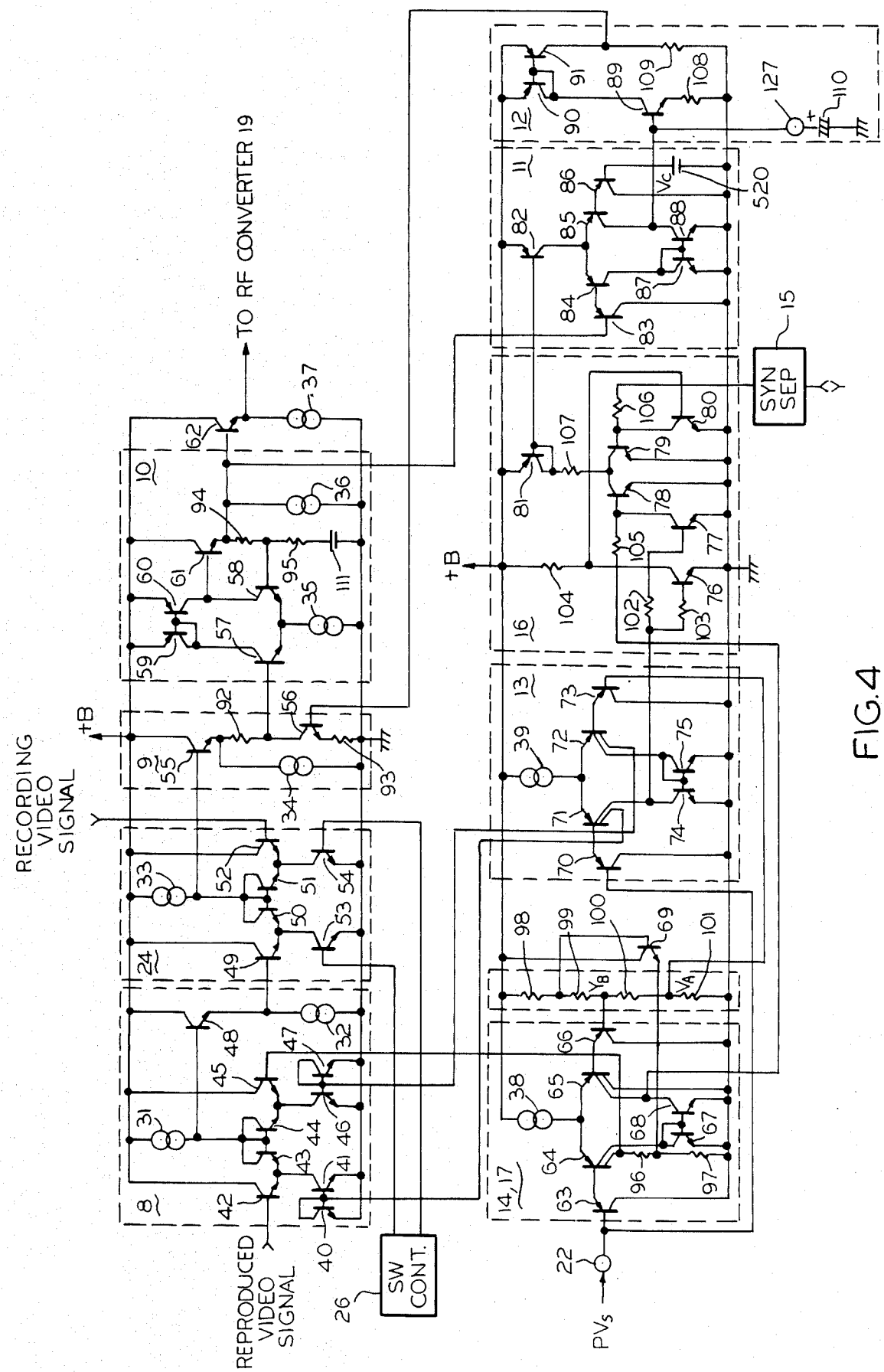
FIG. 4 is a circuit diagram showing a detailed construction of the main part blocks shown in FIG. 3.

Referring to FIG. 4, blocks 8 to 16, 17 and 24 are illustrated as a transistor circuit. When the pseudo vertical synchronizing signal PVs takes the ground level, transistors 70 and 71 in the comparator 13 are turned on, and transistors 72 to 75 are turned off. Transistors 40 and 41 constituting a current source in the switch circuit 8 are thereby turned on, so that the reproduced video signal is amplified by differential transistors 42 and 43 and fed to the switch circuit 24 through an emitter follower transistor 48. In the playback modes, a transistor 53 is in a conductive state and a transistor 54 is in a nonconductive state by the control circuit 26. Therefore, the reproduced video signal is amplified by differential transistors 49 and 50 and fed to a transistor 55 in the level shift circuit 9. On the other hand, in the recoding video signal monitoring mode, the transistor 54 is turned on and the transistor 53 is turned off. Therefore, the recording video signal is amplified by differential transistors 51 and 52 and fed to the transistor 55. The level shift amount in the level shift circuit 9 is controlled by resistors 92 and 93 and a transistor 56 serving as variable impedance elements.

The video signal having the level shifted is amplified by the amplifier 10 constituted of transistors 57 to 61, resistors 94 and 95, current sources 35 and 36 and a voltage source 111, and the output thereof is fed to the comparator 11 and further to the RF converter 19 through an emitter follower transistor 62. The comparator 11 is actuated to execute comparing operation when a current supply transistor 82 is turned on. A diode-connected transistor 81 is provided in the control circuit 16 to bias the transistor 82, and a parallel connection circuit of transistors 78 and 79 is connected to the transistor 81 through a resistor 107. When the transistor 71 in the comparator 13 is turned on, transistors 76 and 77 are also turned on, so that transistors 78 and 80 are brought into a nonconductive state. Accordingly, when the synchronizing separation signal is output from the separater 15, the transistors 79, 81 and 82 are turned on, and the comparator 11 is made operative. The video signal from the amplifier 10 is compared with the reference voltage Vc from the voltage source 520 by transistors 82 to 88, and the comparison output is smoothed to a d.c. voltage by a capacitor 110 connected to a terminal 127. This DC voltage is fed back to the base of the transistor 56 through transistors 89 to 91. Thus, the tip level of each synchronizing signal contained in the reproduced video signal and the recording video signal is clamped at the reference voltage Vc.

When the pseudo vertical synchronizing signal PVs is impressed to the terminal 22 in the special playback mode, the base voltage of the transistor 70 becomes higher than the base voltage of the transistor 73, i.e., the reference voltage $V_A$, from the voltage source 500 constituted of resistors 98 to 101, which also constitute the voltage source 510. The transistors 70, 71 and 40 to 43 are thereby turned off, and the reproduced video signal is separated. On the other hand, the transistors 72 and 73 are turned on, and therefore current supply transistors 46 and 47 operate to activate differential transistors 44 and 45. Since the transistors 74 and 75 turned on, the transistors 76 and 77 of the control circuit 16 are turned off. The transistor 80 is made conductive keep the transistor 79 in the nonconductive state. In the comparator 14, when the pseudo vertical synchronizing signal PVs is impressed, a base voltage of a transistor 63 (64) becomes higher than a base voltage $V_B$ of a transistor 66 (65), so that the transistors 63 and 64 are turned off and the transistors 65 and 66 are turned on. Transistors 67 and 68 are thereby turned off, so that a high level output is derived from the transistor 65 and then fed to the transistor 78. The transistors 78, 81 and 82 are thus turned on and the comparator 11 operates. Since the transistor 64 is in the off state, a node voltage of the resistors 98 and 99 is fed to the base of the transistor 45 through a transistor 69 and a resistor 96. when the pulse 600 (FIG. 2A) is impressed on the terminal 22, the transistors 63, 64, 67 and 68 are turned on and the transistors 65 and 66 are turned off. The transistors 78, 81 and 82 are thereby turned off and the comparator 11 is made inoperative. Since the transistor 64 is turned on, the transistor 45 is supplied with the pulse 600' (FIG. 2D) having an amplitude limited by the current of a current source 38, the resistance value of the resistor 96 and the emitter voltage of the transistor 69. Thus, the transistors 63 to 68, the resistors 96, 97 and the current source 38 have both the functions of the comparator 14 and the waveform shaping circuit 17. Since the comparator 11 is made inoperative, the pulse 600' is fed to the RF converter 19 through the switch circuit 24, the level shift circuit 9 and the amplifier 10. The level during a pseudo vertical blanking period excluding the periods of the pulses 600 is clamped at the reference voltage Vc.

Figure 5:
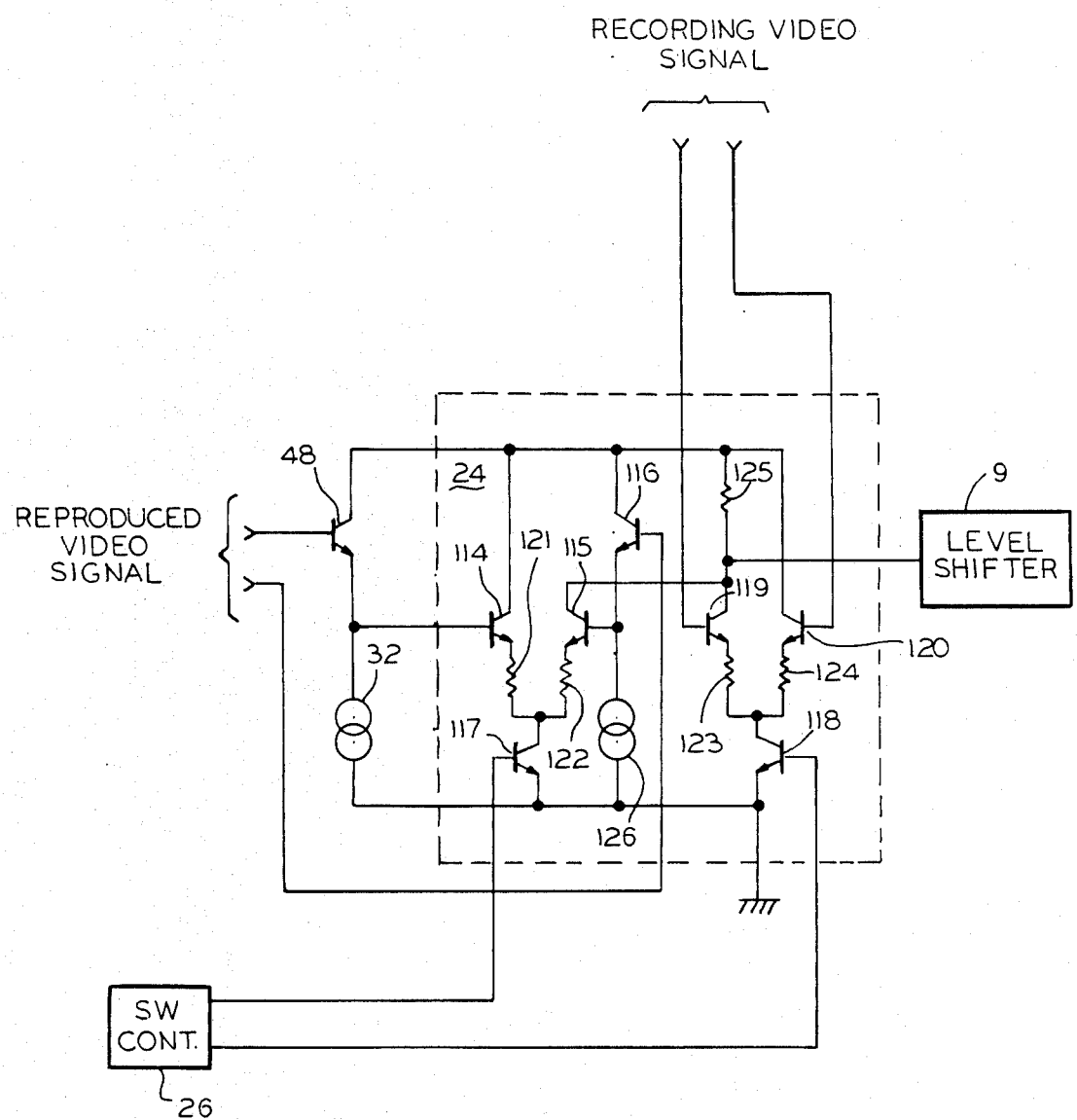
FIG. 5 is a circuit diagram representing another configuration of a switch circuit 24 shown in FIG. 3.

Referring to FIG. 5, another configuration of the switch circuit 24 includes two pair of differential transistors (114, 115) and (119, 120) each having emitter resistors (121, 122) and (123, 124). Accordingly, the values of emitter resistors 121 and 122 of the differential transistors 114 and 115 and those of emitter resistors 123 and 124 of differential transistors 119 and 120 will be set within each permissible dynamic range of the reproduced video signal and the recording video signal, thereby obtaining a desired gain independently of each other. A common load 125 is provided to the differential transistors (114, 115) and (119, 120). The conductive state control of transistors 117 and 118 is controlled by the controller 26 in the same manner as the circuit of FIG. 4.

The present invention is not limited to the above embodiments, but may be changed and modified without departing from the spirit and scope of the invention.

What is claimed is:

1. A video signal processing circuit comprising a first input terminal supplied with a video signal, a second input terminal supplied with a pseudo vertical synchronizing signal having a train of pulses at a predetermined cycle, means coupled to said second input terminal for detecting said pseudo vertical synchronizing signal to generate a detection signal, means coupled to said second input terminal for separating said pulses from said pseudo vertical synchronizing signal, output means coupled to said first input terminal and said separating means for outputting said video signal when said detection signal is not generated and for outputting the separated pulses when said detection signal is generated, and means for clamping an output signal from said output means at a predetermined level during a period corresponding to a synchronizing signal period except for periods when the separated pulses are present.

2. The video signal processing circuit as claimed in claim 1, wherein said clamping means includes operating period control means, means for supplying said operating period control means with synchronizing signals contained in said video signal and means for supplying said operating period control means with said pseudo vertical synchronizing signal having said train of pulses, said operating period control means activating said clamping means in response to the supplied synchronizing signals other than said train of pulses.

3. A video signal processing circuit comprising a first terminal supplied with a reproduced video signal, a second terminal supplied with a pseudo vertical synchronizing signal containing a plurality of pulses at a predetermined cycle during a vertical blanking period, first means coupled to said second terminal for comparing said pseudo vertical synchronizing signal with a reference voltage to produce a switching control signal taking a first level during said vertical blanking period and taking a second level during remaining periods, second means coupled to said second terminal for separating said pulses from said pseudo vertical synchronizing signal and for outputting the separated pulses, a switching circuit having a first input end coupled to said first terminal to receive said reproduced video signal, a second input end coupled to said second means to receive said separated pulses, a control end coupled to said first means to receive said switching control signal and an output end, said switching circuit connecting the first input end to the output end to output said reproduced video signal when said switching control signal takes said second level and connecting the second input end to the output end to output said separated pulses when said switching control signal takes said first level, a clamping circuit coupled to the output end of said switching circuit for operatively clamping an output level of said switching circuit at a predetermined level, and third means for actuating said clamping circuit during a period corresponding to said vertical blanking period except for periods when said pulses are present.

4. The video signal processing circuit as claimed in claim 3, further comprising fourth means for supplying synchronizing signals contained in said reproduced video signal to said third means, said third means further actuating said clamping means in response to said synchronizing signals, whereby each synchronizing signal contained in said reproduced video signal is clamped at said predetermined level.

5. The video signal processing circuit as claimed in claim 3, wherein said pseudo vertical synchronizing signal having a first voltage level during said vertical blanking period, said first voltage level being larger in absolute value than said reference voltage, each of said pulses having a second voltage level which is an intermediate level between said reference voltage and said first voltage level.

6. The video signal processing circuit as claimed in claim 5, wherein said second means includes means for comparing said pseudo vertical synchronizing signal with an additional reference voltage which is an intermediate level between said first and second voltage levels.

7. A video signal processing circuit comprising a first terminal supplied with a reproduced video signal, a second terminal supplied with a pseudo vertical synchronizing signal, said pseudo vertical synchronizing signal changing cyclically between first and second voltage levels during a vertical blanking period and holding a third voltage level during remaining periods, said first and second voltage levels being different from each other and each of said first and second voltage levels being larger in absolute value than said third voltage level, a first voltage source generating a first reference voltage taking an intermediate level between said second and third voltage levels, a second voltage source generating a second reference voltage taking an intermediate level between said first and second voltage levels, a first comparator comparing said pseudo vertical synchronizing signal with said first reference voltage to produce a control signal taking a first logic level during said vertical blanking period and taking a second logic level during said remaining periods, a second comparator comparing said pseudo vertical synchronizing signal with said second reference voltage, waveform shaping means responsive to an output of said second comparator for producing a train of pulses, switching means coupled to said first terminal, said first comparator and said waveform shaping means for transferring said reproduced video signal when said control signal takes said second logic level and for transferring said train of pulses when said control signal takes said first logic level, a clamping circuit coupled to said switching means for operatively clamping an output of said switching means at a third reference voltage, and means responsive to the output of said second comparator for inactivating said clamping circuit when each of said pulses is produced.

8. The video signal processing circuit as claimed in claim 7, wherein said clamping circuit includes a level shifter supplied with the output of said switching means, an amplifier amplifying an output of said level shifter, a third comparator comparing an output of said amplifier with said third reference voltage and means responsive to an output of said third comparator for controlling a level shifting value of said level shifter.

* * * * *